United States Patent [19]

Trudeau

[11] Patent Number: 4,718,780
[45] Date of Patent: Jan. 12, 1988

[54] SEALED COMPOUND BEARING AND METHOD FOR MAKING THE SAME

[75] Inventor: William H. Trudeau, Brighton, Mich.

[73] Assignee: O & S Manufacturing Company, Whitmore Lake, Mich.

[21] Appl. No.: 902,508

[22] Filed: Sep. 2, 1986

[51] Int. Cl.$^4$ .................. F16C 27/02; F16C 23/04; F16C 33/20

[52] U.S. Cl. .................... 384/206; 384/202; 384/210; 384/908

[58] Field of Search .................. 384/138–140, 384/143, 145, 146, 151–153, 202–210, 220, 222, 276, 295–297, 299, 301, 908, 909

[56] References Cited

U.S. PATENT DOCUMENTS

| | | | |
|---|---|---|---|
| 2,304,595 | 12/1942 | Prentice | 384/222 |
| 3,700,295 | 10/1972 | Butzow et al. | 384/210 |
| 3,909,084 | 9/1975 | Snidar et al. | 384/203 |
| 4,135,773 | 1/1979 | Van Remoortel | 384/125 |

FOREIGN PATENT DOCUMENTS 1150912  5/1969  United Kingdom ............... 403/130

Primary Examiner—Stuart S. Levy
Assistant Examiner—Thomas R. Hannon
Attorney, Agent, or Firm—Gifford, Groh, VanOphem, Sheridan, Sprinkle and Dolgorukov

[57] ABSTRACT

A compound bearing having a shell defining a cylindrical bore in which is installed the bearing inner member, a bearing ring of ultra high molecular weight polymer being disposed within the shell cylindrical bore between the bore surface and the peripheral surface of the inner member. The polymer bearing ring is extruded in strips cut to length and wrapped around the inner member with abutting ends prior to inserting the ring within the shell bore. In structures wherein the inner member is a spherical member or ball, the strip is extruded with a cylindrical groove on at least one surface such as to form a concave spherical surface when wrapped around the spherical peripheral surface of the inner member.

4 Claims, 5 Drawing Figures

SEALED COMPOUND BEARING AND METHOD FOR MAKING THE SAME

BACKGROUND OF THE INVENTION

The present invention relates generally to bearing structures and, more particularly, to a bearing structure adapted for oscillatory motion when under heavy load conditions.

The present invention is an improvement over the compound bearings described and claimed in U.S. Pat. No. 4,331,367 to Trudeau et al. In that patent a sealed compound bearing consists of outer and inner members movable relative to each other, between which are disposed load carrying annular members comprising elastomeric rings held between the outer and inner members under compression, and a metallic ring insert disposed between and separating the two elastomeric rings.

It has been found that bearings, according to the prior art, although satisfactory and long-lived under average medium duty service, tend to deteriorate rapidly when subjected to extremely heavy loads, especially if subjected to heat simultaneously with heavy loads, and, more particularly, in assemblies where adverse conditions of heavy load and heat are accompanied by substantial vibrations and shocks and an exaggerated amount of twisting, or relative motion, between the inner member and the outer member of the bearing. Such extremely adverse conditions are particularly prevalent when spherical bearings are utilized as a junction between suspension members and frame members, such as shock absorber attachment means in heavy duty motor vehicles, for example military combat vehicles, which are generally poorly maintained and called upon to operate under extremely adverse conditions. It has been discovered that under such extremely adverse conditions, when the bearings are continuously subjected to rapid twisting cycles under extremely heavy loads with repeated high frequency shocks, prior art bearings tend to heat up and, when further subjected to heat from the ambient, they deteriorate rapidly. The lubricant impregnating the fabric annular members becomes very fluid and extrudes from the fabric, and the extreme heat chars the fabric annular members and destroys the nylon or other plastic insert ring. It has also been discovered that because the prior art bearings are pre-loaded during manufacturing, they are relatively tight when new, and thus they provide a relatively stiff connection between the joined components and tend to generate heat when the engaged surfaces of the various components of the bearings are displaced relative to each other, due to the relatively high co-efficient of friction between the bearing element surfaces.

Further, in some prior art bearings, an elastomeric material, such as rubber, is used and, under stressful conditions, the rubber loosens from the bond between the shell and the rubber. This condition, of course, is not acceptable.

SUMMARY OF THE INVENTION

The present invention remedies the disadvantages and inconveniences of the prior art, more particularly in heavy duty bearing assemblies subjected to oscillatory motion under heavy loads, especially loads of a shock nature occurring at frequent intervals, by providing a bearing structure wherein a plastic ring insert is used in replacement of the metallic ring insert of the prior art patent cited herein.

The principal advantage and object of the present invention is to provide a heavy duty bearing structure that is capable of being subjected to heavy loads, repeated vibrations and shock loads, under adverse heat and dust conditions. Such bearing has a longer useful life under extremely harsh conditions of operation and in adverse environmental situations.

The many objects and advantages of the present invention will become apparent to those skilled in the art when the following description of the best mode contemplated for practicing the invention is read in conjunction with the accompanying drawing wherein:

DETAILED DESCRIPTION OF A PREFERRED EMBODIMENT OF THE INVENTION

Figure 1:
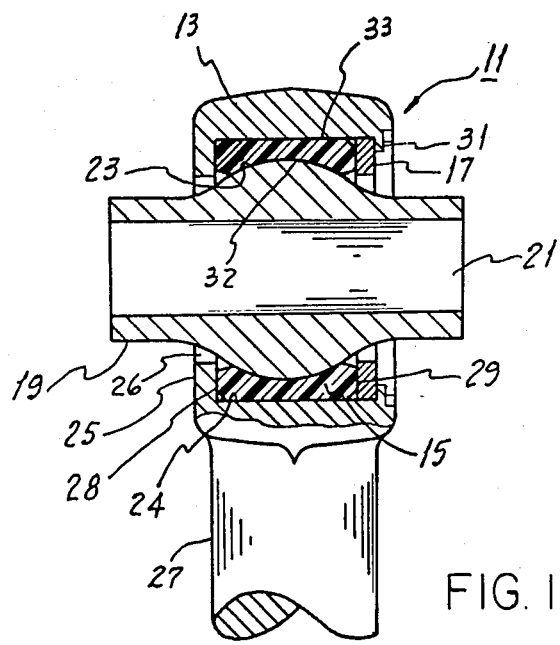
FIG. 1 is a schematic longitudinal section through a sealed compound bearing of the spherical or ball type in accordance with a preferred embodiment of the invention.

Referring to FIG. 1, an example of a sealed compound bearing structure 11 in accordance with a preferred embodiment of the present invention is shown in section as consisting only of four separate elements in assembly, namely an outer bearing shell 13 within which is disposed a plastic bearing ring 15, a washer 17 retaining the plastic bearing ring 15 within the bearing shell 13, and an inner bearing member in the form of a spherical member or ball 19. In the example of structure illustrated, the ball 19 is in the form of a tubular member or sleeve having a cylindrical bore 21 and a peripheral partially spherical outer bearing surface 23, shaped about as shown at FIG. 1.

The bearing shell 13 is generally cylindrical in form and is made of steel, or is a stainless steel forging which is welded on the end of a rod or bar 27, such as, for example, a heavy truck suspension tie rod. In some instances it may be the rod or bar 27 itself that is machined at an end, or at both ends, in such a way as to provide the cylindrical axial bore 24 of the bearing shell 13, leaving at one end of the bore a wall or flange 25 having an aperture 26 therein.

Figure 2:
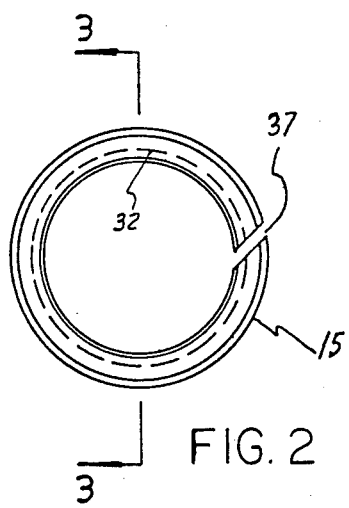
FIG. 2 is a side elevation view of a plastic bearing ring forming part of the assembly of FIG. 1.
Figure 3:
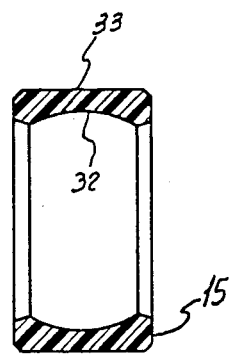
FIG. 3 is a view along line 3—3 of FIG. 2.

The plastic bearing ring 15, shown at FIGS. 2 and 3, is preferably made of "Ultra High Molecular Weight" polymer, or UHMW polymer, sold and marketed under the trademark "1900" by Himont U.S.A., Inc. of Wilmington, Del. 19894, under the trademark HOSTALEN GUR of American Hoechst Corporation of Pasadena, Tex. 77507 and Houston, Tenn. 77258, and under the trademark TUFLAR by Keltrol Enterprises, Inc. of York, Pa. 17402.

Figure 3A:
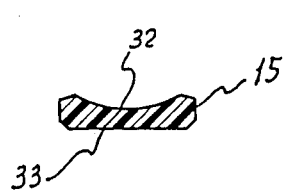
FIGS. 3a and 3b are sections through alternate extrusion configurations for the plastic bearing ring of FIGS. 2 and 3.
Figure 3B:
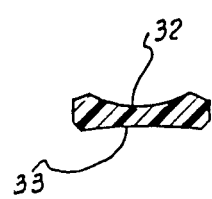

The polymer material is extruded through appropriate extrusion dies to the cross-section shape shown at FIGS. 3a, or to the alternate shape shown in cross-section at FIG. 3b. The extruded polymer material is cut into segmental lengths that are bent to a cylindrical form to surround the ball sleeve 19, FIG. 1. The ends of each segment have biased edges separated by a gap 37, FIG. 2. The gap 37, however, may close, thus causing the biased edges of the gap 37 to abut when the segment, or bearing ring 15, disposed around the ball 19, is inserted into the bore 24 of the bearing shell 13 so that an end face 28 of the bearing ring 15 is abutting the internal surface of the flange 25.

After the bearing ring 15 is placed in the shell bore 24, the washer 17 is inserted into the shell 13 and abuts the other end face 29 of the bearing ring 15. The edge of the open end of the shell 24 is crimped by means of an appropriate tool to form an annular lip or diminutive flange 31 that abuts the washer 17 and secures the whole assembly of the bearing 11.

The UHMW polymer used for making the bearing ring 15 has high wear, corrosion and impact shock resistance and provides non-stick surfaces having self-lubricating properties, is highly abrasive resistant and chemically inert. It thus permits to manufacture bearings, without the requirement of providing appropriate seals preventing introduction of dirt between the bearing surfaces.

The UHMW polymer material, when exerted in the shape shown in cross-section at FIG. 3a is provided on one surface with a cylindrical groove 32, and a flat opposite surface 33. After cutting to lengths and bending to the form of the annular bearing ring 15, FIGS. 2-3, the cylindrical groove 32 defines the concave spherical surface 32 of the assembled bearing 11 of FIG. 1, in engagement with the spherical peripheral surface 23 of the ball 19, the flat surface 33 of the extruded strip defining the cylindrical surface 33 of the bearing ring 15 pressed into the cylindrical bore 24 of the bearing shell 13. The extrusion profile of FIG. 3b provides opposite cylindrically grooved surfaces 32 and 33. When cut to length and wrapped around the ball 19 such that the cylindrically grooved surface 32 is in engagement with the spherical peripheral surface 23 of the ball 19, during insertion into the cylindrical bore 24 of the shell 13 the surface 33 is elastically deformed to a substantially cylindrical surface 33, FIG. 1, held in engagement within the shell bore 24, thus substantially increasing the curvature of the surface 32 such as to engage precisely with the spherical peripheral surface of the ball 19.

It will be appreciated by those skilled in the art that although the compound bearing of the invention has been described and illustrated as a spherical-type bearing, cylindrical bearing may be made, comprising a bearing ring insert extruded of UHMW polymer in flat strips, cut to length, and inserted within an outer member having a cylindrical bore and an inner member having a cylindrical peripheral surface.

While the foregoing has described the invention in terms of a preferred embodiment thereof, modifications whereof, within the scope of the appended claims, will be apparent to those skilled in the art.

I claim:

1. A bearing comprising:
   an outer shell having a cylindrical bore;
   an inner member disposed in said cylindrical bore, said inner member having a spherical peripheral surface;
   a bearing ring interposed between said cylindrical bore and said inner member, said bearing ring being an elongated extruded strip of UHMW polymer having an inner surface and an outer surface extending between a pair of biased edges, said inner surface having a cylindrical groove, said extruded strip being wrapped about said inner member such that said pair of biased edges are positioned adjacent to each other, said cylindrical groove forming a concave spherical surface in engagement with said spherical peripheral surface of said inner member when said extruded strip is wrapped about said inner member; and
   means retaining said bearing ring in said shell.

2. The bearing of claim 1 wherein said means for holding said wrapped strip of UHMW polymer material is a flange at an end of said shell cylindrical bore, a washer installed within said shell cylindrical bore at the other end of said bore in engagement with an end of said bearing ring, and means for retaining said washer in position.

3. The bearing of claim 2 wherein said means for retaining said washer in position is a diminutive flange formed by crimping edgewise said shell at said other end of said bore.

4. The bearing as claimed in claim 1 wherein said outer surface of said bearing ring further comprises a concave surface extending between said pair of biased edges, the curvature of said concave surface being flattened to form a generally planar surface and the curvature of said concave spherical surface of said inner surface being substantially increased to precisely engage said spherical peripheral surface of said inner member when said elongated strip is interposed said cylindrical bore and said inner member.

* * * * *